Aug. 29, 1933.  D. R. STAPLES ET AL  1,924,332
CONTROL SYSTEM FOR MOTOR GENERATOR LOCOMOTIVES
Filed Jan. 18, 1929   2 Sheets-Sheet 2

| Position | Switches | | | | | | | | |
|---|---|---|---|---|---|---|---|---|---|
| | 37 | 38 | 59 | 76 | 77 | 78 | 86 | 91 | 95 |
| a | O | O | O | | | | | | |
| b | O | O | O | O | O | O | | | |
| c | O | O | | O | O | O | O | | |
| d | O | O | | O | O | O | O | O | |
| e | O | O | O | O | O | O | O | O | O |
| f | O | O | O | | O | O | O | O | O |
| g | O | O | O | | | O | O | O | O |
| h | O | O | O | | | | O | O | O |

INVENTORS
Dana R. Staples &
Elden I. Staples
BY
Wesley G. Carr
ATTORNEY

Patented Aug. 29, 1933

1,924,332

UNITED STATES PATENT OFFICE 1,924,332

CONTROL SYSTEM FOR MOTOR-GENERATOR LOCOMOTIVES

Dana R. Staples, Wilkinsburg, and Elden I. Staples, Pittsburgh, Pa., assignors to Westinghouse Electric and Manufacturing Company, a corporation of Pennsylvania Application January 18, 1929. Serial No. 333,380

6 Claims. (Cl. 172—239)

This invention relates to electric locomotives and particularly to locomotives of the motor-generating type.

An object of the invention is to provide a motor-generator locomotive that shall be simple in construction and efficient in its operation.

Another object of the invention is to provide for the reduction of rheostatic losses incident to the acceleration of electric motor vehicles.

A further object of the invention is to provide for the initiating of regenerative braking by actuating the controller handle towards the "off" position.

A further object of the invention is to provide an electric locomotive, of the motor-generator type, with means for connecting and disconnecting the propelling or traction motors from the generator when the voltage of the generator is approximately equal to the counter-electromotive force of the traction motors.

A still further object of the invention is to provide for the interruption and re-application of the power supply to a traction motor while the motor vehicle is coasting without causing shock to a train propelled by the vehicle, or the opening of the circuit breakers or other protective devices which may result from an abnormal regenerated current.

A still further object of the invention is to provide for the interruption of a regenerative braking operation, in the event that emergency braking, by means of air brakes or other type of brakes, becomes necessary.

A still further object of the invention is to provide for disconnecting the traction motor from the generator the moment the current flow between them drops to a predetermined value.

And a still further object of the invention is to provide for quickly interrupting the power supply to the traction motors of a motor vehicle either in case of emergency braking or during light load, as for example, when it may be desired to alternately apply or interrupt the power supply to the traction motors when the motor vehicle is coasting or drifting.

For a fuller understanding of the invention, reference should be had to the following description taken in conjunction with the accompanying drawings in which, Figure 1 is a schematic illustration of the circuits and apparatus of a locomotive arranged in accordance with the invention;

Figure 1:
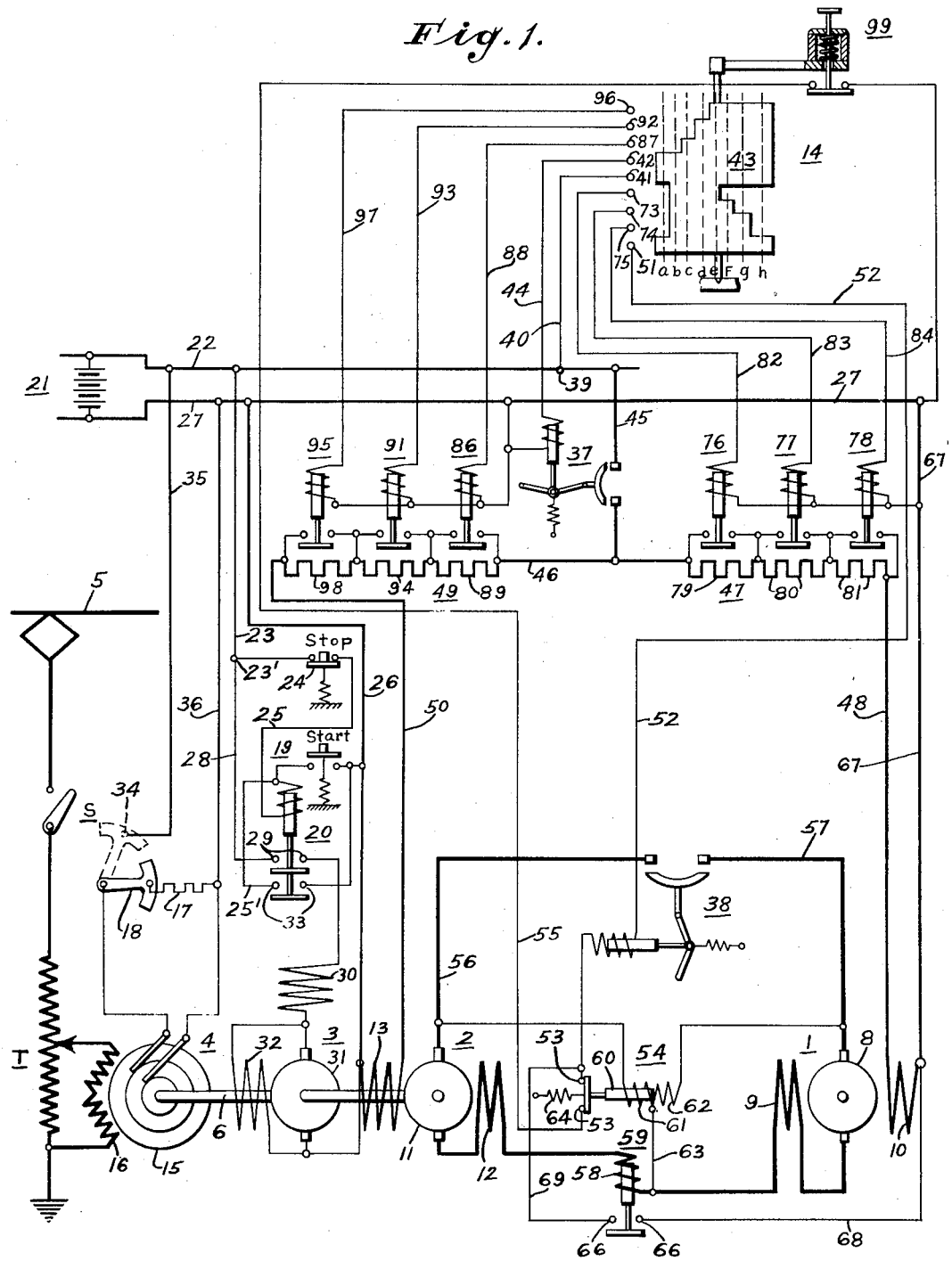
Figures 2, 3:
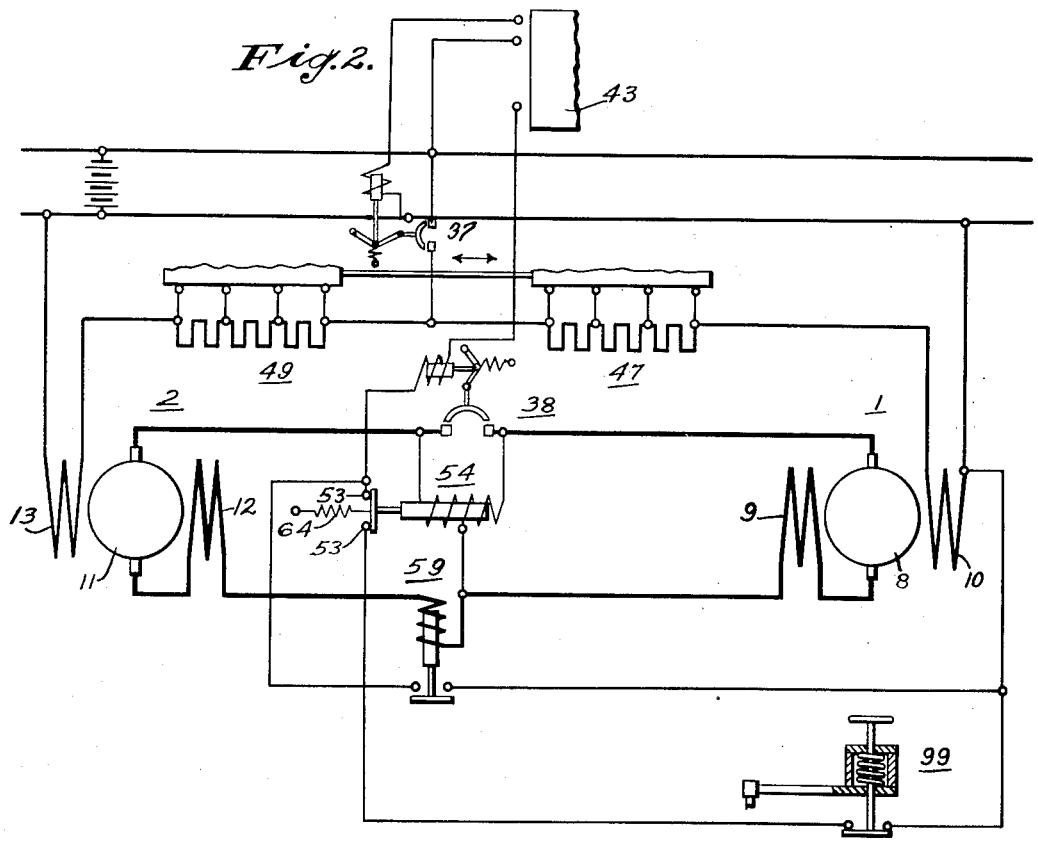
Fig. 2 is a simplified diagram of the system shown in Fig. 1.
Fig. 3 is a sequence chart illustrating the switches which are closed for the various positions of the master controller.

Referring now to the drawings and particularly to Fig. 1, a motor-generator type locomotive is illustrated which comprises, in general, a direct-current traction motor 1, a direct-current generator 2, a direct-current exciter generator 3, an alternating-current single-phase synchronous motor 4 and an auto transformer T disposed for connection to an alternating current trolley conductor 5. The generators 2 and 3 and the motor 4 are mechanically coupled to a shaft 6.

The motor 1 and generator 2 are preferably of the compound wound type. As shown the motor 1 comprises an armature 8, a series field winding 9 and a separately excited field winding 10.

The generator 2 comprises an armature 11, a series field winding 12 and a separately excited field winding 13.

The operation of the motor 1 and the generator 2 may be controlled by a controller 14 of the drum type.

The synchronous motor 4 comprises a wound-rotor winding 15 and a single-phase stator winding 16. Since the motor 4 is of the single-phase alternating current type it is not self-starting, therefore, in order to facilitate the starting of the synchronous motor 4 the generator 3 may be utilized as a motor for accelerating the rotor 15 of the motor 4 to a speed at which the motor will operate as an induction motor. In order to cause the motor 4 to operate as an induction motor, a resistor 17 and a movable contact member 18 are provided for shunting the rotor winding 15.

In order to connect the exciter generator 3 to operate as a motor, a starting push button switch 19 is provided.

In this embodiment of the invention when the starting switch 19 is actuated, a circuit is established for the actuating coil of a switch 20, which is disposed to connect the generator 3 across a battery 21.

The actuating circuit for the switch 20 may be traced from the battery 21 through conductors 22 and 23, junction point 23', a stop push-button switch 24 which normally stands closed, conductor 25, the actuating coil of switch 20, the starting switch 19 and conductors 26 and 27 back to the battery 21.

The switch 20 is closed and a circuit for operating the generator 3 as a motor established which circuit may be traced from the junction point 23' through conductor 28, contact members 29 bridged by the upper contact plate of switch 20, series field winding 30 of the exciter generator 3, armature 31, shunt field winding 32 and conductors 26 and 27 back to the battery 21. Further upon the closure of the switch 20, a shunt is connected around the starting switch 19 and a holding circuit established which extends from the energized conductor 25 through the actuating coil of the switch 20, conductor 25', the contact members 33 bridged by the lower contact plate of switch 20 to conductor 26. Therefore, the starting switch 19 may be released to its open circuit position.

When the exciter 3 is operated as a motor, it will accelerate the motor 4 to a speed at which it will begin operating as an induction motor if the stator winding 16 is energized. When the rotor winding 15 of the motor 4 is being rotated, a switch S may be closed so as to connect the auto-transformer T to the trolley conductor 5. The auto-transformer T being energized, the stator winding 16 of the motor 4 will also be energized and the motor 4 will begin to operate as an induction motor.

When the speed of the motor 4, while operating as an induction motor, has approached the synchronous value, the movable contact member 18 may be actuated into engagement with a stationary contact member 34 as indicated in broken lines. When the switch contact member 18 engages the stationary contact 34, the rotor winding 15 is connected across the battery 21.

The circuit established when the contact member 18 engages the stationary contact member 34 may be traced from the battery 21 through conductor 35, contact members 34 and 18, the rotor winding 15 and conductors 36 and 27 back to the battery. Since the rotor winding 15 is energized with direct current, the motor 4 will pull into step and operate at synchronous speed.

Assuming that it is desired to start and accelerate the vehicle (not shown) propelled by the motor 1, the controller 14 may be actuated to position a or its first running position. In this position, energizing circuits are established for actuating coils of switches 37 and 38.

When the switch 37 is closed, the field windings 10 and 13 of the motor 1 and the generator 2, respectively, are connected across the battery 21. Upon the closing of the switch 38, the armature 8 of the motor is connected across the armature 11 of the generator.

The circuit established for the actuating coil of the switch 37 may be traced from the battery 21, conductor 22, junction joint 39, conductor 40, contact fingers 41 and 42, bridged by contact segment 43 of the controller 14, conductor 44, the actuating coil of the switch 37 and conductor 27 back to the battery 21.

The circuit for the field winding 10 may be traced from junction point 39 through conductor 45, the contact members of the switch 37, conductor 46, resistor 47, conductor 48, the field winding 10 and conductors 67 and 27 back to the battery 21.

The circuit established for the field winding 13 of the generator 2 may be traced from the junction point 39, conductor 45, contact members of the switch 37, conductor 46, resistor 49, conductor 50, field winding 13, and conductors 26 and 27 to the battery 21.

The circuit established for the actuating coil of the switch 38 may be traced from junction point 39 through conductor 40, contact fingers 41 and 51—bridged by contact segment 43 of the controller 14—conductor 52, the actuating coil of the switch 38, normally closed contact members 53 of a differential relay 54, conductors 55 and 27 back to the battery 21.

The motor circuit established when the switch 38 is closed may be traced from the armature 11 of the generator 2 through conductor 56, contact members of the switch 38, conductor 57, the armature 8, series field winding 9 of the motor 1, an actuating coil 58 of a current responsive relay 59, and series field winding 12 of the generator 2 back to the armature 11.

The differential relay 54 comprises an armature 60 and series connected actuating coils 61 and 62. It will be observed that the coils 61 and 62 are connected across the armatures of the generator 2 and the motor 1, respectively, through a common conductor 63, and are disposed to open the contact members 53 of the relay 54 when the voltage developed by the generator 2 exceeds that developed by the motor 1, or vice versa by a predetermined amount, provided the switch 38 has not been closed.

However, in order to provide for the closing of the switch 38 when the motor 1 is standing still, that is, when the armature thereof is not rotating, and the generator 2 is developing a voltage, the contact members of the relay may be biased towards a closed position by a spring 64. It will be observed that when the switch 38 has been closed, the voltage impressed on the respective coils 61 and 62 will be equal and since the coils are in opposition there will be no resultant pull on the armature 60 tending to open the contact members of the relay. Since the contact members of the relay will not open under these conditions, the switch 38 will remain closed unless the actuating coil thereof is deenergized by operation of the controller 14.

When the motor 1 has been connected across the generator 2 by the closing of the switch 38, current will flow from the generator to the motor which current will energize the actuating coil 58 of the relay 59 whereby contact members 66 of the relay will be closed to provide a circuit around the contact members 53 of the relay 54. Therefore, the actuating coil of the switch 38 will be maintained energized even though the contact members 53 of the relay 54 should be opened.

The circuit established around or parallel to the contact members 53 may be traced from the conductor 27 through conductors 67 and 68, the contact members 66 of the relay 59, conductor 69, the coil of the switch 38, conductor 52 and contact members 51 and 41 bridged by the contact segment 43 of the controller 14 to the junction point 39. It is to be observed that when the current flowing through the coil 58 of the relay 59 falls below a predetermined value, the contact members 66 thereof will be opened.

When the controller 14 is actuated to position b contact fingers 73, 74 and 75 will be bridged by the contact segment 43 of the controller 14 and circuits established for actuating coil of switches 76, 77, and 78, respectively. The switches 76 to 78, inclusive, are disposed to shunt sections 79, 80 and 81, respectively, of the resistor 47. When all of these resistor sections have been shunted full field excitation will be provided for the motor 1 so that full tractive effort may be developed during the starting of the train.

The energizing circuit for the actuating coil of the switch 76 may be traced from the junction point 39 through conductor 40, contact fingers 41 and 73, bridged by contact segment 43, conductor 82, the actuating coil of switch 76 and conductors 67 and 27 back to the battery 21.

The energizing circuit for the actuating coil 77 may be traced from the junction point 39 through conductor 40, contact fingers 41 and 74, conductor 83, the actuating coil of the switch 77 and conductors 67 and 27 back to the battery 21.

Similarly, the energizing circuit of the switch 78 may be traced from the junction point 39 through conductor 40, contact fingers 41 and 75, conductor 84, the actuating coil of switch 78 and conductors 67 and 27 to the battery 21.

Since the actuating coils of the switches 76, 77 and 78 are energized simultaneously, the switches will all be closed to shunt the entire resistor 47. Full voltage is therefore applied to the field winding 10 so that the motor may start with full field excitation.

In order to maintain full field excitation on the motor until full voltage has been impressed on its armature by the generator 2, the controller is so arranged that the switches 76, 77 and 78 will remain closed until full voltage has been applied to the motor.

In order to increase the speed of the motor 1, while the motor is operating with full field excitation, the voltage applied thereto may be increased in steps. This may be accomplished by shunting sections of the resistor 49 step-by-step so as to increase the voltage developed by the generator 2. Sections of the resistor 49 may be shunted step-by-step by actuating the controller 14 through positions c, d and e.

When the controller has been actuated to position c, a circuit is established for an actuating coil of a switch 86. This circuit may be traced from the junction point 39 through conductor 40, contact fingers 41 and 87—bridged by contact segment 43—conductor 88, the actuating coil of the switch 86 and conductor 27 to the battery 21. Therefore, the switch 86 is closed to shunt section 89 of the resistor 49. Therefore, the current through the field winding 13 of the generator 2 is so increased that the voltage developed by the generator is increased. The voltage of the generator 2 having been increased, the speed of the motor will increase also.

When the controller 14 has been actuated by position d, an energizing circuit for an actuating coil or a switch 91 is established. This circuit may be traced from the junction point 39 through conductor 40, contact fingers 41 and 92—bridged by contact segment 43—conductor 93, the actuating coil of switch 91 and conductor 27 to the battery 21. Therefore, switch 91 is closed and a section 94 of the resistor 49 is shunted whereby the current through the field winding 13 is further increased, which increase in field current will cause the voltage developed by the generator 2 to increase also. This voltage increase will cause the motor to increase its speed.

When the controller has been actuated to the position e or its full voltage position, an energizing circuit for an actuating coil of a switch 95 is established. This circuit may be traced from the junction point 39 through conductor 40, contact fingers 41 and 96, conductor 97, the coil of switch 95 and conductor 27 to the battery 21. Therefore, the switch 95 is closed and a section 98 of the resistor 49 is shunted, whereby the field current through the field winding 13 is still further increased. The voltage of the generator 2 and the speed of the motor 1 will, therefore, be increased also.

When the controller 14 has been actuated to its full voltage position, that is, the position in which the generator is supplying full voltage to the motor while it is operating with full field excitation, the speed of the motor 1 may be increased by decreasing the current through the field winding 10 step-by-step. In order to decrease the field excitation of the motor 1, step-by-step, the controller 14 may be actuated through positions f, g and h.

By actuating the controller 14 through positions f, g and h, respectively, the energizing circuits, above traced, for the actuating coils of the switches 76, 77 and 78 will be deenergized successively. Therefore, the sections 79, 80 and 81 of resistor 47 will be reconnected successively, or step-by-step into the circuit of the field winding 10. The field excitation of the motor 1 will, therefore, be decreased in steps until the motor has reached its full running speed.

If it may be assumed that the controller 14 is in its full running position, and that the motor 1 is operating at its full running speed, and that it is desired to cause the motor 1 to regenerate current and drive the generator 2 as a motor which in turn will drive the synchronous motor 4 as an alternating current generator, the controller 14 may be actuated towards its "off" position. In so doing the field excitation of the motor 1 will be increased and the field excitation of the generator 2, with continued movement of controller towards the "off" position, is decreased.

Since the motor 1 under these conditions is driven by the momentum of the vehicle, the voltage developed by the motor 1 will exceed that developed by the generator 2, hence regenerative braking will be effected. However, it is to be noted that when the controller is in its "off" position, the switches 37 and 38 will be opened to disconnect the motor 1 from the generator 2. If the vehicle is still in motion it is to be understood that other means of braking may be employed to bring the vehicle to a stop if that is desired.

In some instances when the vehicle propelled by the motor 1 is operating at full running speed, certain occasions may arise when it is necessary to effect emergency braking. In such cases, it is desirable that the power applied to the motor be interrupted as quickly as possible and preferably at the instant when the current flowing from the generator to the motor passes through zero value.

In order to cause the switch 38 to open the moment that the current flowing from the generator to the motor passes through zero or approximately zero value, a push button switch 99 is provided for deenergizing the actuating coil of the switch 38. The switch 99 is so arranged thatn when actuated to its open circuit position, the actuating coil of the switch 38 will be deenergized the moment the contact members 66 of the relay 59 are opened responsive to the passing of the motor current through zero value.

The push-button switch 99 may be mounted on the engineer's handle of the controller 74, as shown in Fig. 1, or in any other convenient location.

If the motor 1 is motoring and an emergency arises which requires that the power be interrupted as quickly as possible from the motor, the push-button switch 99 may be depressed and the controller 14 actuated towards the "off" position.

In doing so the motor 1 will act as a generator in the manner hereinbefore set forth. Therefore, the moment the counter electromotive force or the voltage developed by the motor 1, is approximately equal to the voltage developed by the generator 2, the current flowing from the motor to the generator will be zero or substantially zero and the relay 59 will open its contact members 66 whereby the circuit for the actuating coil for the switch 38 is deenergized, to cause the switch 38 to open.

When the power supply for the motor is interrupted, emergency braking, as by air brakes or other suitable braking means, may be employed to bring the vehicle to a stop. It is to be noted that until the contact members 66 of the relay 59 have opened, the circuit for the actuating coil of the switch 38 will not be interrupted even though the contact members of the switch 99 are open, because the energizing circuit of the actuating coil of the switch 38 will be maintained through the contact members of the relay 59 in the manner hereinbefore set forth.

If it be assumed that the vehicle is moving at a speed at which the motor 1 is regenerating current, that is, operating as a generator and an emergency should arise requiring that the power supply to the motor be interrupted as quickly as possible, then, in order to cause the switch 38 to open when the current flowing from the motor to the generator passes through zero, the push button switch is depressed and the air brakes applied. In this case the controller need not be moved towards its "off" position, because when the brakes are applied the vehicle will slow down to a speed at which the motor will cease to regenerate and start to act as a motor to accelerate the vehicle. The moment the motor changes from generating to motoring, the relay 59 will open. Therefore, the switch 38 will open in the same manner as hereinbefore described.

The control system employed for governing the operation of the vehicle propelled by the motor 1 is also adapted to that class of service which requires intermittent application of power to the motor 1 while the vehicle is coasting or drifting without causing shocks to the train propelled by the vehicle. Ordinarily, intermittent application of power will result in violent shocks to the train because of abnormal current surges from the generator to the motor, or vice versa, but the operation of the system herein disclosed is such that shocks of this character are substantially prevented.

For example, if the vehicle is operating at normal speed and it is desired to disconnect the motor from the generator 2, then the operator may actuate the controller 14 to its "off" position. In this position the switches 38 and 37 will be open. If it be further assumed that the vehicle is coasting and that it is desired to reconnect the motor 1 to the generator 2, then the moment the switch 37 is closed, the motor 1 and the generator 2 will be supplied with equal or approximately equal amounts of field excitation. Since the motor 1 is being driven by the momentum of the vehicle, it may be possible that the armature of the motor is not rotating at the same speed as the armature of the generator; therefore, it will be apparent that the voltage developed by the motor may not be equal to that of the generator 2.

If the voltages are not equal or approximately so, the differential relay 54 will operate to prevent the establishment of the energizing circuit for the actuating coil of the switch 38 until these voltages are equal, or approximately equal. Therefore, the engineer or operator will be required to actuate the controller 14 to that position in which equal voltages will be developed by the generator 2 and the motor 1, before a closing of the switch 38 can be effected. When this condition obtains, the differential relay 54 will close its contact members and permit the energizing circuit for the coil of the switch 38 to be established. Therefore, the switch 38 will close only when the voltages developed by the generator 2 and the motor 1 are substantially equal. Since the switch 38 closes under such conditions there will be no appreciable current surges from the motor to the generator or from the generator to the motor as the case may be. Therefore, shocks to the motor and the vehicle will be diminished to a point at which they are not objectionable, if any shocks should result.

Since various modifications may be made in the invention herein described without departing from the spirit and the scope thereof, it is desired that the embodiment of the invention herein disclosed shall be interpreted in an illustrative and not a limiting sense.

We claim as our invention:

1. In a control system, in combination, a traction motor for propelling a vehicle, a generator for supplying power to said motor, a single controller for successively varying the voltage of the generator and the motor to approximately equal values while the vehicle is in motion, means for automatically connecting the motor to the generator when said voltages are approximately equal, means for automatically disconnecting the motor from the generator when the current flowing through them is at a low value, and manually operable means for controlling the operation of said disconnecting means.

2. In a control system for motor vehicles provided with a generator, a prime mover therefor, and a traction motor, in combination, means for connecting the motor to the generator, a controller for successively increasing the generator excitation and decreasing the motor excitation to effect acceleration of the vehicle, means for automatically disconnecting said motor from the generator when the current traversing the motor and generator passes through a relatively low predetermined value, as the controller is moved towards the "off" position, and manually operable means for controlling the operation of said disconnecting means.

3. In a control system for motor vehicles provided with a generator, a prime mover therefor, and a traction motor, in combination, means for connecting the motor to the generator, a controller for successively increasing the generator excitation and decreasing the motor excitation to effect acceleration of the vehicle, means for connecting and disconnecting the motor from the generator at will while the vehicle is in motion, said means being disposed to preclude reconnecting of the motor to the generator until the motor counter voltage is approximately equal to the generator voltage, and means for preventing the motor from being disconnected from the generator when the motor current exceeds a predetermined value.

4. In a control system for a motor vehicle provided with a generator, a prime mover for the generator, and a traction motor, said generator and traction motor being provided with armature and field windings, in combination, a switch for connecting said motor to the generator, a coil for actuating said switch, means for establishing a switch closing circuit for said coil, and means responsive to the current flowing in a circuit including said motor and generator for establishing a holding circuit for said switch actuating coil.

5. In a control system for a motor vehicle provided with a generator, a prime mover for the generator, and a traction motor, said generator and traction motor being provided with armature and field windings, in combination, a switch for connecting said motor to the generator, a coil for actuating said switch, means for establishing a switch closing circuit for said coil, and electromagnetic means responsive to the current flowing in a circuit including said motor and generator for establishing a holding circuit for said switch operating coil.

6. In a control system for a motor vehicle provided with a generator, a prime mover for the generator, and a traction motor, said generator and traction motor being provided with armature and field windings, in combination, a contactor for connecting the motor to the generator, a coil for actuating said contactor, a switch in a circuit for the coil for controlling said coil, and means responsive to current flowing in a circuit including said motor and generator for effecting deenergization of said actuating coil when said current has reached a predetermined value provided the switch has been actuated.

DANA R. STAPLES.
ELDEN I. STAPLES.